United States Patent [19]
Innes et al.

[11] Patent Number: 5,883,031
[45] Date of Patent: *Mar. 16, 1999

[54] LOW TEMPERATURE REGENERATION OF COKE DEACTIVATED REFORMING CATALYSTS

[75] Inventors: Robert A. Innes, San Rafael; Dennis L. Holtermann, Crockett; Bernard F. Mulaskey, Fairfax, all of Calif.

[73] Assignee: Chevron Chemical Company, San Ramon, Calif.

[ * ] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,155,075.

[21] Appl. No.: 373,484

[22] Filed: Jan. 17, 1995

Related U.S. Application Data

[63] Continuation of Ser. No. 914,906, Jul. 16, 1992, abandoned, which is a continuation-in-part of Ser. No. 663,237, Mar. 1, 1991, Pat. No. 5,155,075.

[51] Int. Cl.$^6$ ............ B01J 20/34; C10G 35/06
[52] U.S. Cl. ............ 502/38; 502/34; 502/53; 208/138
[58] Field of Search ............ 502/34, 38, 53; 208/138

[56] References Cited

U.S. PATENT DOCUMENTS

| | | | |
|---|---|---|---|
| 3,836,597 | 9/1974 | Sie | 208/140 |
| 3,986,982 | 10/1976 | Crowson et al. | 252/415 |
| 4,225,419 | 9/1980 | Myers | 208/135 |
| 4,354,925 | 10/1982 | Schorfheide | 208/140 |
| 4,359,400 | 11/1982 | Landolt et al. | 252/415 |
| 4,493,901 | 1/1985 | Bernard et al. | 502/37 |
| 4,507,397 | 3/1985 | Buss | 502/38 |
| 4,600,700 | 7/1986 | McHale | 502/52 |
| 4,631,123 | 12/1986 | Russ et al. | 208/138 |
| 4,645,751 | 2/1987 | McCullen et al. | 502/37 |
| 4,650,565 | 3/1987 | Jacobson et al. | 208/138 |
| 4,657,874 | 4/1987 | Borghard et al. | 502/35 |
| 4,719,189 | 1/1988 | Krishnamurthy | 502/50 |
| 4,752,595 | 6/1988 | McCullen et al. | 502/50 |
| 4,810,683 | 3/1989 | Cohn et al. | 502/37 |
| 4,851,380 | 7/1989 | Van Leirsburg et al. | 502/37 |
| 4,855,269 | 8/1989 | Mohr | 502/37 |
| 4,914,068 | 4/1990 | Cross et al. | 502/74 |
| 5,073,529 | 12/1991 | Miller et al. | 502/49 |
| 5,114,565 | 5/1992 | Zones et al. | 208/138 |
| 5,155,075 | 10/1992 | Innes | 502/52 |

*Primary Examiner*—Glenn Caldarola
*Assistant Examiner*—Thuan D. Dang
*Attorney, Agent, or Firm*—Burns, Doane, Swecker & Mathis, L.L.P.

[57] ABSTRACT

A process for regenerating a coke contaminated reforming catalyst comprising platinum on a molecular sieve, said process consisting essentially of contacting said catalyst with a halogen-free oxygen-containing gas at a temperature of less than 780° F. for a sufficient period of time such that the aromatization activity is restored to within 20° F. of the activity said catalyst possessed at the start of the previous run cycle.

29 Claims, No Drawings

LOW TEMPERATURE REGENERATION OF COKE DEACTIVATED REFORMING CATALYSTS

This application is a continuation of application Ser. No. 07/914,906, filed Jul. 16, 1992 now abandoned, which is a continuation-in-part of application Ser. No. 07/663,237, filed Mar. 1, 1991 now U.S. Pat. No. 5,155,075.

BACKGROUND OF THE INVENTION

The subject of the present invention is a process for the regeneration of a hydrocarbon reforming catalyst which has been deactivated due to buildup of carbonaceous material on the catalyst. More specifically, the present invention provides a method for regenerating a coke deactivated reforming catalyst by a controlled low temperature carbon-burn procedure which results in the catalyst having activity, selectivity and stability characteristics approximating, or which are even better than, the catalyst prior to the buildup of carbon. The reforming catalysts intended to be regenerated by the process of the present invention comprise a molecular sieve material and platinum.

Platinum containing catalysts are widely used in the oil refining and petrochemical industries, and are particularly important in a reforming process where paraffins, olefins and naphthenes are converted to aromatic compounds. Conventional reforming catalysts typically include one or more metals, most typically platinum, dispersed on a base, and may also include a binding agent for adding physical support to the base, and chloride to provide an acidic function. Typically, the catalyst base is alumina, but recently molecular sieve based catalysts have been found to be effective for reforming reactions.

Catalytic compositions containing zeolites are well known in the industry and recently the use of L-zeolites in combination with other specified catalytic components have been found to be particularly preferred for reforming. The aromatic compounds produced by such a catalytic conversion are valuable to a refiner due to their higher octane rating, and may be recovered from the reforming product for further processing and reaction in the petrochemical industries. The L-zeolite catalysts are particularly effective for converting $C_6$ and $C_7$ non-aromatic hydrocarbons which normally boil between 125° F. and 225° F., to benzene and toluene.

In the reforming process, a hydrocarbon feedstock is passed through a catalyst-containing reactor in the presence of hydrogen at an elevated temperature. In the reactor and upon contact with the reduced or activated catalyst, some of the paraffins, olefins and naphthenes in the feedstock react to form a more desired, higher octane aromatic product. In the course of typical reforming operations, the catalysts will typically become deactivated due to the deposition of carbonaceous material or "coke" upon the catalyst, and/or sintering or poisoning of the catalytic metal particles. In commercial practice, the deactivated catalyst will then be regenerated by a process which may include as a step the exposing of the catalyst to an oxygen containing gas at elevated temperature (typically 950° F. final burn temperature) to burn the carbonaceous deposits accumulated on the catalyst. However, prior to our present invention, burning the coke off the catalyst at elevated temperatures caused the catalytic metal to agglomerate, which significantly lowered the activity and thus worsened the performance of the catalyst. Consequently, specific steps directed to the redispersion of the catalytic metal on the base were necessary. The redispersion steps typically comprise contacting the catalyst with a chloride containing gas in the presence of oxygen and water vapor, and are well known in the art.

In U.S. Pat. No. 4,493,901 issued Jan. 15, 1985 to Bernard et al., a method of regenerating a catalyst comprising platinum and a non-acidic L-zeolite is described, whereby the catalyst is subjected to a multi-step process, the first step being exposure to a hydrogen environment, followed by a carbon burn step, and then a calcination step followed specifically by an oxychlorination step. The regeneration method of Bernard et al. utilizes a hydration step following the oxychlorination step. In the hydration step, a quantity of water is added to the cooling air.

In U.S. Pat. No. 4,810,683, issued Mar. 7, 1989, to Cohn, a method is described which utilizes a halogen or halogen containing gas during the carbon burn step. The burning step of the process of U.S. Pat. No. 4, 810,683 occurred necessarily in the presence of a halogen or halogen containing gas and at a temperature of from 300° C. to 600° C.

U.S. Pat. No. 3,986,982, issued Oct. 19, 1976, to Crowson et al., describes a method for regenerating a deactivated platinum group metal-loaded zeolites by burning off deposits on the catalyst with a stream of inert gas and oxygen at a temperature controlled to a maximum of 550° C. Example 1 shows a stepwise burn procedure to 530° C. The water content was held at 100–130 ppm. This was followed by treating with a stream of an inert gas containing from 0.5 to 20.0 vol % oxygen and from 5 to 500 ppmv chlorine as chlorine gas. The resultant catalyst is purged to remove residual oxygen and chlorine and then reduced with hydrogen.

U.S. Pat. No. 4,359,400, issued Nov. 16, 1982, to G. R. Landolt et al., describes a process whereby multimetallic platinum containing catalysts are contacted with oxygen containing gas at elevated temperatures to burn off coke and then treated with dry, oxygen-free hydrogen halide. The catalyst is then treated with $Cl_2$ containing gas which is oxygen and water-free.

U.S. Pat. No. 4,719,189, issued Jan. 12, 1988 to A. S. Krishnamurthy describes a process for rejuvenating a coke-deactivated nobel metal containing zeolite catalyst. The process comprises contacting the catalyst with a mixture of oxygen and sulfur dioxide, followed by catalyst reduction. Temperatures from 752°–840° F. are preferred.

U.S. Pat. No. 4,645,751, issued Feb. 24, 1987, to S. B. McCullen et al., describes a process for rejuvenating a highly silicious (silica-alumina ratio of at least 20) Pt zeolite catalyst wherein the Pt has become agglomerated. The agglomerated catalyst is first reduced with hydrogen. Following reduction the catalyst is treated with hydrogen chloride and oxygen in an inert gas carrier at 400°–450° C.

U.S. Pat. No. 4,752,595, issued Jun. 21, 1988, to S. B. McCullen et al., describes a process for regenerating a nobel-metal containing zeolite catalyst. The process consists of a coke burn step followed by a low temperature reduction step (212°–482° F.) Oxidizing conditions for the coke burn include temperatures ranging from 392°–1004° F., preferably 752°–950° F.

U.S. Pat. No. 4,657,874, issued Apr. 14, 1987, to W. S. Borghard et al., describes a method where Pt on a highly silicious zeolite is redispersed. The process comprises a coke burn followed by oxychlorination. The oxygen burn step is done under conditions that are sufficiently mild to prevent any alteration in the crystal structure of the zeolite. Example 6 uses a temperature of 850° F. This is then followed by treating with a stream of inert gas containing 6 to 15 Torr of chlorine gas and water vapor such the molar ratio of water to chlorine gas is between 0.01 and 2.0. Oxygen may also be present. The rejuvenation is typically carried out at 450° C. (842° F.).

U.S. Pat. No. 4,851,380, issued Jul. 25, 1989, to D. A. Van Leirsburg et al., describes a process for regenerating a sulfur contaminated reforming catalyst. The process includes a platinum agglomeration step which can be accomplished by contacting the catalyst with $O_2$ between 800° F. and 1200° F. and an oxychlorination step. Pt redispersion by contacting an agglomerated catalyst with carbon monoxide and a sulfur free halogen acid gas.

U.S. Pat. No. 4,855,269, issued Aug. 8, 1989, to D. H. Mohr, discloses a platinum redispersion method comprising a wet oxychlorination step, followed by a nitrogen purge, followed by reduction.

U.S. Pat. No. 4,914,068 issued Apr. 3, 1990, to V. R. Cross, describes a process for the improved retention of the platinum dispersion following oxychlorination if the catalyst is cooled to 430° C. or preferably less than 375° C. prior to start of reduction. Coke was burned off the catalyst at 510° C. prior to reduction.

Unfortunately, the presence of halogens such as chlorine or fluorine or their compounds during regeneration results in the formation of corrosive by-products such as HCl and $NH_4Cl$. These compounds can cause damage to equipment used in the reforming process such as heat exchangers, liquid/gas separators and reactor internals. The halogen containing compounds and their products necessary for platinum redispersion are highly toxic as well. Therefore, it is highly desirable to have available a catalyst regeneration procedure that does not include the use of a halogen containing gas.

U.S. Pat. No. 5,073,529, issued Dec. 17, 1991 to Miller et al., describes a process for regenerating a coke-deactivated reforming catalyst. A two-step carbon burn procedure is used wherein the catalyst is initially contacted with oxygen and an inert gas at a temperature ranging from 500°–700° F. During the second step, the catalyst is contacted with oxygen and an inert gas at a temperature ranging from 850°–950° F.

SUMMARY OF THE INVENTION

The present invention relates to a halogen-free process to regenerate a coke contaminated catalyst comprising platinum on a molecular sieve support which process comprises contacting said catalyst with an oxygen-containing gas at a temperature of from 300° F. to no more than about 780° F. More particularly, it relates to a process to regenerate a coke contaminated catalyst comprising contacting said catalyst with a halogen-free oxygen-containing gas at a maximum temperature of less than 780° F. for a sufficient period of time such that the aromatization activity is restored to within 20° F. of the aromatization activity the catalyst possessed at the start of the previous run cycle. By the term "aromatization activity" we mean the extrapolated start-of-run temperature where the run conditions and the feed as well as the aromatics yield are substantially the same as in the previous run cycle. By the practice of the present invention, the platinum on the catalyst remains sufficiently dispersed on the support to allow for an activity change of not more than 20° F. upon termination of the regeneration procedure, and return of the catalyst to hydrocarbon conversion service. Thus, the catalyst aromatization activity is based upon the temperature needed to achieve a desired constant aromatics production. Typically, we have controlled our process to about 40 to 42 wt. % aromatics in the product, although other values may be set, in other circumstances. Regeneration by the process of the present invention results in a catalyst which has an aromatization activity, as defined above, which is within 20° F. of the temperature needed in the previous run to achieve the same constant aromatics production.

Among other factors, we have found that by limiting the ultimate temperature in the carbon burn regeneration procedure to a maximum temperature of less than 780° F., preferably between 600° F. to 750° F. the catalyst may be is restored to an activity very close to that of the fresh catalyst, without requiring a metal re-dispersion step. It is further preferred the carbon burn be initiated at a temperature of less than about 500° F. and further that the recycle gas be dried to achieve a water concentration in the recycle gas of less than 1000 ppm water, prior to the recycle gas entering the reforming reactor train.

We have found that by avoiding addition of a halogen or halogen containing gas during or after the carbon burn procedure, plant deterioration due to stress cracking and corrosion is minimized. Further, prior to our present invention, it was common practice to circulate soda ash or morpholine solutions through effluent heat exchangers, transfer lines, and liquid-gas separators during the regeneration of reforming catalyst in order to prevent corrosion due to chlorides. The need to use corrosion inhibitor solutions is eliminated when regenerating reforming catalyst by the method of the present invention.

In general, the art teaches away, i.e., describes high temperature burn procedure followed by redispersion step or, burn/redispersion combined. We have now, surprisingly, found that if the coke burn and reduction are both done at low temperatures and with low concentration of water, the regenerated catalyst has excellent activity and unexpectedly long life.

Surprisingly, we have also found that the rate of deactivation or "fouling rate" of the regenerated catalyst decreases following the application of the regeneration process of the present invention. Thus, a catalyst regeneration procedure was discovered in which noble metal does not appreciably agglomerate; eliminating the need for a redispersion step, which are among the advantages of using the present regeneration method on a Pt containing molecular sieve type catalyst.

DETAILED DESCRIPTION OF THE INVENTION

As explained in the summary section above, the present invention is a procedure for regenerating reforming catalysts, comprising platinum on a molecular sieve support.

By the term "reforming" we mean the process of converting paraffins, naphthenes or olefins to aromatic hydrocarbons via hydrodecyclization or dehydrogenation. Feeds useful in reforming typically include hydrocarbons having from six to eleven carbon atoms, but these feeds can also include narrower cuts, such as a $C_6$ to $C_7$ cut. Indeed, the reforming catalysts that can be regenerated by the process of this invention can be used to make chemicals as well as gasoline components. For example, benzene, toluene or mixtures thereof can be produced by reforming hydrocarbons having six to seven carbon atoms.

The catalysts advantageously regenerated by the method of this invention comprise platinum on a molecular sieve support. Molecular sieves are defined as porous materials which exhibit the property of acting as sieves on a molecular scale. The molecular sieves of most interest for catalysis are those which have uniform pore sizes in the 4.2 to 15 Angstrom diameter range, particularly crystalline materials of the aluminophosphate, aluminosilicate, and pure silica types. The aluminosilicate molecular sieves include zeolites and certain modified clays.

Examples of aluminophosphate molecular sieves include ALPO-5, ALPO-11, ALPO-31, ALPO-34, and ALPO-41, as well as isostructural materials containing silicon, cobalt, manganese, magnesium, iron, chromium, titanium, or other elements as part of the crystalline framework. Zeolite molecular sieves of particular interest include zeolite types X, Y, and L, mordenite, ZSM-5, ZSM-12, ZSM-20, SSZ-25, SSZ-26, and beta zeolite. Examples of modified clays with molecular sieving properties include pillared bentonites and hectorites. Silicalite and SSZ-24 are examples of molecular sieves composed of substantially silica. Silicalite has the same crystal structure as ZSM-5 except that substantially all of the aluminum atoms have been replaced with silicon atoms. SSZ-24 is the all-silica structural analog of ALPO-5.

Catalyst Description

In copending application Ser. No. 496,119, assigned to the assignee of the present invention and entirely incorporated by reference herein, an intermediate pore size crystalline silicate having a silica to alumina ratio of preferably at least 500, is described. We have found the present catalyst regeneration process may be advantageously used to regenerate the intermediate pore size crystalline silicate catalyst, and that the present process may also be advantageously applied to a mixed catalyst system comprising the intermediate pore size crystalline silicate described in copending application Ser. No. 496,119.

A preferred catalyst to regenerate by the process of this invention comprises platinum on an alkaline earth or alkali metal exchanged, L-zeolite. It is especially preferred that this catalyst be protected from sulfur poisoning during its use in reforming, so that the catalyst is never contacted with more than 100 ppb by weight sulfur in the feed. This can be accomplished by using a sulfur converter/sorber system as described in U.S. Pat. No. 4,925,549 to Robinson et al. The regeneration process of this invention is especially effective on substantially sulfur free catalyst.

In addition to platinum, the catalysts regenerated by the present invention may contain elements such as rhenium, tin, germanium, iridium, copper, iron, cobalt, nickel, and titanium which in certain cases may improve catalyst selectivity or stability. For naphtha reforming, it is desirable that the molecular sieve catalyst have a low acidity. Acid sites may be neutralized by ion exchange with alkali ions such as lithium, sodium, potassium, cesium and rubidium ions or alkaline earth ions such as calcium, magnesium, strontium, and barium. With zeolites, low acidity may also be achieved by substituting boron for aluminum in the zeolite framework; for example, boron substituted beta zeolites or by using a zeolite with a silica/alumina ratio greater than 500.

The present invention has been found to be particularly effective when applied to large-pore zeolites. Large-pore zeolites are defined as zeolites having an effective pore diameter of between 6 and 15 Angstroms. Among the large-pore zeolites which have be n found to be useful as reforming catalysts, L-type zeolites are the most important. Other important zeolites include X-zeolites, Y-zeolites, mordenites, and zeolite beta.

A typical composition of L-type zeolites, expressed in terms of mole ratios of oxides, may be represented as follows:

$$(0.9\text{--}1.3)M_{2/n}O:Al_2O_3(5.2\text{--}6.9)SiO_2:yH_2O$$

wherein M designates a cation, n represents the valance of M, and y may be any value from 0 to 9. Zeolite L, its X-ray diffraction pattern, its properties and method for its preparation are described in detail in U.S. Pat. No. 3,216,789 which is hereby incorporated by reference. The true formula may vary without changing the crystalline structure. For example, the mole ratio of silicon to aluminum (Si/Al) may vary from over a range which is typically 1.5 to 3.5, but may be higher. The barium exchanged form of zeolite L is particularly preferred as described, for example, in U.S. Pat. Nos. 4,434,311 and 4,547,472.

The chemical formula for zeolite Y expressed in terms of oxide molar ratio may be written as:

$$(0.7\text{--}1.1)Na_2O:Al_2O_3:yH_2O$$

wherein x is a value between 3 and 6, and y may be a value up to 9. Zeolite Y has a characteristic X-ray diffraction pattern which may be employed with the above formula for identification. Zeolite Y is described in more detail in U.S. Pat. No. 3,130,007. U.S. Pat. No. 3,130,007 is hereby incorporated by reference herein to show a zeolite useful in the present invention.

More recent patents disclose high silica/alumina versions of zeolite Y produced by steaming and/or chemical extraction which removes aluminum from the framework of the originally synthesized zeolite. Y-zeolites with framework silica/alumina ratios as high as 50:1 or higher may be prepared by these methods, and are useful supports for the reforming catalysts regenerated by the method of the present invention.

Zeolite X is a synthetic crystalline zeolitic molecular sieve which may be represented by the formula:

$$(0.7\text{--}1.1)\ M_{2/n}O:Al_2O_3:(2.0\text{--}3.0)SiO_{02}:yH_2O$$

wherein M represents a metal, particularly alkali and alkaline earth metals, n is the valence of M, and y may have any value up to about 8 depending upon the identity of M and the degree of hydration of the crystalline zeolite. Zeolite X, its x-ray diffraction pattern, its properties and method for its preparation are described in detail in U.S. Pat. No. 2,882,244, which is hereby incorporated by reference in its entirety to show a zeolite useful in the present invention.

Zeolite beta is a known synthetic crystalline aluminosilicate originally described in U.S. Pat. Nos. 3,308,069 and RE 28,341 to which reference is made for further details of this zeolite, its preparation and properties. These references describe the composition of zeolite beta in its as-synthesized form as follows:

$$[XNa(1.0\pm 0.1\text{-}X)TEA]AlO_2.Y\ (SiO_2.W\ H_2O)$$

where X is less than 1, preferably less than 0.75, TEA represents tetraethylammonium ion, Y is greater than 5 and less than 100, and W is up to about 4, depending on the condition of dehydration and on the metal cation present. These references also teach that the sodium ion may be replaced by another metal ion using ion exchange techniques. Subsequent publications such as European Patent Applications Nos. 95,304; 159,846; 159,847; and 164,939 have broadened the definition of zeolite beta to include materials prepared using templating agents other than tetraethylammonium hydroxide and materials having a Si/Al ratio greater than 100. Also the zeolite described in European Patent Application No. 55,046 ("Nu-2") and British Patent Application No. 2,024,790 ("Borolite B") have structures and X-ray diffraction patterns similar to that of zeolite beta and are included within the scope of the term "zeolite beta" as used herein.

Mordenite is a commercially available zeolite which occurs in nature and has also been synthesized. Both "small port" and "large port" mordenites have been synthesized. The "large port" form is preferred for catalysis and is described in *"Zeolite Molecular Sieves"* by Donald W. Breck, published by John Wiley and Sons. A typical oxide composition is:

$$Na_2O.Al_2O_3.9-10\ SiO_2.6\ H_2O$$

The silica/alumina ratio may be increased by extracting alumina using various chemical and thermal methods similar to those employed with zeolite Y.

The percentage of platinum in the catalyst is between 0.1% and 10%, the lower limit corresponding to minimum practical catalyst activity and the upper limit to roughly the maximum possible platinum utilization. Preferably, the catalyst contains between 0.2 and 5.0 percent platinum. Group VIII metals are introduced into a large-pore zeolite during synthesis, impregnation or ion exchange in an aqueous solution of an appropriate metal salt. If it is desired to introduce two Group VIII metals onto the large-pore zeolite, the operation may be carried out simultaneously or sequentially.

By way of example, platinum can be introduced by impregnating the large-pore zeolite with an aqueous solution of tetrammineplatinum (II) nitrate $[Pt(NH_3)_4](NO_3)_2$, tetrammineplatinum (II) chloride $[Pt(NH3)4]C2$, or diamminoplatinum $[Pt(NH_3)_2](NO_2)_2$. In an ionic exchange process, platinum can be introduced by using cationic platinum complexes such as tetrammineplatinum (II) nitrate.

A binder may be used in the preparation of the catalysts. An inorganic oxide is used as a matrix to bind the large-pore zeolite. This binder can be a natural or a synthetically produced inorganic oxide or combination of inorganic oxides. Typical inorganic oxide binders which can be used include clays, alumina, silica or mixtures thereof. Preferable binders are alumina, silica, or mixtures thereof. Acidic sites on the binder are preferably exchanged by cations which do not impart strong acidity (such as sodium, potassium, rubidium, cesium, calcium, strontium or barium).

After the desired metal or metals have been introduced, the catalyst is typically calcined in air and then reduced in a hydrogen environment.

The regeneration process of the present invention may be useful on catalysts in the physical form of extrusions, spheres, pills, pellets, granules, broken fragments, or various other shapes known in the art.

Catalyst Use and Contamination

The reforming catalysts regenerated by the process of the present invention are used for aromatization of $C_6$ to $C_{11}$, preferably $C_6$ and $C_7$ non-aromatic hydrocarbons. Accordingly, a hydrocarbon feedstream which comprises a $C_6$ to $C_{11}$ paraffin, olefin, or naphthene, is contacted with the catalyst at aromatization conditions. Aromatization conditions typically include an absolute pressure of from about 0.5 to about 50.0 atmospheres, with the preferred pressure being from about 1.0 to about 10.0 atmospheres, a temperature of from about 800° F. to about 1200° F., preferably 800° F. to 1050° F., and a liquid hourly space velocity of from between about 0.1 to about 10 per hour. Preferably, hydrogen is employed in the process. When present, hydrogen may be circulated at a rate of from about 1.0 to about 10.0 moles of hydrogen per mole of hydrocarbon in the hydrocarbon feedstream. Feed streams entering the reforming reactors should be low enough in sulfur and water to prevent catalyst deactivation by sulfur poisoning or platinum sintering.

Catalyst Regeneration Method

The gradual accumulation of coke and other deactivating carbonaceous deposits on the catalyst will eventually reduce the activity of the catalyst and selectivity of the aromatization process. Typically, catalyst regeneration becomes desirable when from about 0.5 to about 3.0 wt. % or more of carbonaceous deposits are laid down upon the catalyst. At this point, it is typically necessary to take the hydrocarbon feedstream out of contact with the catalyst and purge the hydrocarbon conversion zone with a suitable gas stream. The catalyst regeneration method of the present invention is then performed either by unloading the catalyst from the conversion zone and regenerating in a separate vessel or facility or performing regeneration in-situ. Alternatively, the catalyst may be continuously withdrawn from the reactor for regeneration in a separate vessel, to be returned to the reactor as in a Continuous Catalytic Reformer.

In fixed bed operation, it may sometimes be necessary to dump the catalyst from the reactors and screen out fines in order to reduce pressure drop. This typically occurs after several years of operation. The dump and screen procedure is usually done in combination with a catalyst regeneration. First carbon is burned off the catalyst following the procedures of this invention. This also serves to reoxidize finely divided metals on the catalyst such as iron and platinum. In their metallic form, these metals will rapidly oxidize when exposed to air and possibly ignite a fire or explosion when hydrocarbons are also present.

The catalyst is then dumped from the reactors into a screening device where the fines are removed. It is then reloaded into the reactors and dried by circulating nitrogen through the reactors and recycle gas dryer while heating to reduction temperature. When water levels in the reactor effluent are sufficiently low, the catalyst is then reduced according the procedures of this invention and returned to reforming service. The dryout time can be shortened and the catalyst protected from water, carbon dioxide, and sulfur compounds in the atmosphere by blanketing with nitrogen or dry air during the dumping,, screening; and reloading processes.

According to the catalyst regeneration method of the present invention, the essential step of the method incorporates a lower temperature carbon burn step. The lower temperature carbon burn step involves contacting the deactivated catalyst with a gaseous mixture of oxygen and an inert gas. The oxygen is typically derived from air and an inert gas serves as a diluent, such that oxygen concentration is from about 21 mole % oxygen to a lower limit which for the practice of the present invention may be as low as 0.1 mole % oxygen. The practice of the present invention is not limited to use of air, however, and higher levels of oxygen may be used in methods where oxygen is supplied in a more pure form such as from cylinders or other containing means. Typical inert gases useful in the low temperature carbon burn step may include nitrogen, helium, carbon dioxide, and like gases or any mixture thereof; nitrogen being preferred. The regeneration gases should be substantially sulfur-free as they enter the reactor, and preferably contain less than 100 part per million by volume water. Because the oxygen content determines the rate of burn, it is desirable to keep the oxygen content low so as not to damage the catalyst by overheating and causing metal agglomeration, while still conducting the carbon burn step in a manner that is both quick and effective. We have found it desirable to keep the oxygen level in the inlet to the regeneration vessel between 0.2 to 4.0 mole % during the practice of the present invention to avoid thermal damage to the catalyst, and still allow for the regeneration process to be accomplished in a reasonable amount of time.

The low temperature carbon burn process of the present regeneration method occurs at a temperature of between 300° F. to 780° F. Other conditions present during the low temperature carbon burn step include a pressure sufficient to maintain the flow of the gaseous oxygen containing mixture through the catalyst zone such as a pressure of between about 1.0 to 50.0 atmospheres and preferably from about 2 to about 15 atmospheres, and a gas hourly space velocity of about 100 to about 10,000 per hour, with a preferred value of about 500 to about 5,000 per hour.

The regeneration method of the present invention is performed in a halogen-free environment. By halogen-free, we mean that chlorine, fluorine, bromine, or iodine or their compounds including for example, hydrogen chloride, carbon tetrachloride, ethylene dichloride, propylene dichloride; are not added at anytime during the catalyst regeneration process.

It is desirable to keep water levels low during the reforming reactions and during the regeneration procedure. This is especially true when temperatures are above 700° F. Although short periods of time (several minutes) at water levels as high as saturation can be tolerated at 700° F. and higher, it is desirable to avoid this high a water level.

A preferred embodiment of the present invention includes the use of a dryer in combination with flowing at least a portion of the combustion gas resulting from the contacting of the catalyst with the oxygen containing gas to a dryer and recycling the dried combustion gas to the catalyst zone. We have found that drying the recycle gas further reduces catalytic metal agglomeration, resulting in a more active regenerated catalyst. It is preferred that water in the recycle gas be reduced to less than 1000 ppmv, more preferably less than 10 ppmv, prior to the gas being recirculated to the catalyst zone. It is also preferred that water in the recycle gas be reduced to between 100 and 1000 ppmv prior to the gas being recirculated to the catalyst zone. We have found results to be best when a fresh dryer is employed just prior to the beginning of and throughout the coke-burn step.

In the preferred embodiment of the present invention, the low temperature carbon burn step results in removing most of the carbonaceous material from the catalyst while leaving an amount of from between 0.1 to about 0.5 wt. % carbon on the catalyst. Although the present invention is not limited by any theory of operation, one possible explanation of the resulting improved catalyst performance is that the small amount of carbon remaining on the catalysts locates at the acid sites, and thus significantly decreases the fouling rate of the regenerated catalyst. Surprisingly, we have also found the yield of $C_5+$ product to increase slightly after a first regeneration of the catalyst.

Further, in another preferred embodiment of the present invention, the first reactor inlet temperature is increased during the carbon burn in a step-wise fashion over a period of about one to five days from an initial temperature of less than 500° F., preferably between 300° F. and 500° F. to achieve a final peak catalyst bed temperature of less than 780° F., preferably between about 600° F. and 750° F.

The oxygen concentration at the first reactor inlet should be controlled in the process of the present invention so as to limit exotherms and high moisture levels due to hydrocarbon combustion. Therefore, in the practice of a preferred embodiment of the present invention, the oxygen is maintained at a level between about 0.2 mole % and 2.0 mole % in the oxygen containing gas throughout the carbon burn-off step. During the initial stages of the burn, it is preferred the oxygen level be maintained at a level between 0.2 and 0.5 mole %. As the rate of burn subsides, oxygen levels may be increased to between 0.5 and 4.0 mole %.

The resulting regenerated catalyst with a portion of carbonaceous material burned off is thereafter typically cooled to about 500° F. and purged with nitrogen or another inert gas to displace the oxygen and any water therefrom. The exit gas is easily monitored to determine when the catalyst zone is substantially free of oxygen and water.

After the low temperature carbon burn-off and purge, the catalyst is activated by treatment with hydrogen. In the initial reduction step, the catalyst is contacted with a hydrogen containing stream at a temperature of from about 300° F. to about 700° F. for a period of at least of about 0.1 to about 10.0 hours. Preferred conditions for the reduction step are from about 400° F. to about 600° F. for a period from about 0.1 to about 2.0 hours. The pressure and gas rates utilized in the reduction step are preferably very similar to those above described in the low temperature carbon burn step. Following the initial reduction, the catalyst may be further reduced and dried by circulating a mixture of inert gas and hydrogen while raising the temperature to between 900° and 10000° F. In the reduction step, metallic components are returned to their elemental state and the resulting regenerated catalyst possesses activity, and selectivity characteristics quite similar to those occurring in a fresh catalyst. Additionally, we have found the regenerated catalyst has improved stability, as measured by a decreased fouling rate. When iron oxides are present on the catalyst or in the piping, it is desirable to use at least a 4:1 mole ratio of nitrogen to hydrogen during the reduction and dryout procedure, in order to limit the formation of $NH_3$ to less than 200 ppmv.

After completing the reduction step, the temperature is lowered to 800° F. or less. The reforming process in which the catalyst is employed may be resumed by charging the hydrocarbon feedstream to the catalyst zone and adjusting the reaction conditions to achieve the desired conversion and product yields.

The following examples are intended to further exemplify the invention, and are not intended to limit the invention in any way.

LOW TEMPERATURE REGENERATION

EXAMPLE I

Pretreatment and Composition of Naphtha Feedstock

A hydrocarbon feedstock was hydrotreated and dried to remove sulfur, oxygen, and water. The treated feed was stored under nitrogen to keep it substantially free of water and oxygen. The sulfur content of the hydrotreated feed was about 0.1 ppmw. A gas chromatographic analysis showed the following composition.

| | LV % |
|---|---|
| i-pentane | 0.0 |
| n-pentane | 0.5 |
| 2,2-dimethylbutane | 2.2 |
| 2,3-dimethylbutane | 3.5 |
| 2-methylpentane | 17.9 |
| 3-methylpentane | 14.5 |
| n-hexane | 20.0 |
| 2,2-dimethylpentane | 1.3 |
| 2,4-dimethylpentane | 1.7 |
| 2,3-dimethylpentane | 2.8 |
| 2-methylhexane | 7.5 |
| 3-methylhexane | 8.5 |
| n-heptane | 4.5 |
| $C_8^+$ paraffins | 2.1 |
| cyclopentane | 1.2 |
| methylcyclopentane | 4.9 |
| cyclohexane | 2.0 |
| methylcyclohexane | 0.5 |
| other $C_6$—$C_7$ naphthenes | 1.7 |
| benzene | 0.2 |
| toluene | 0.7 |
| ethylbenzene | 0.2 |
| heavies | 1.6 |

EXAMPLE II

First Run Cycle Starting with Fresh Catalyst

Eighty cubic centimeters of fresh reforming catalyst were charged to a one-inch diameter tubular reactor. The catalyst comprised platinum on barium exchanged L-zeolite and a binder. The reactor was installed in a naphtha reforming pilot plant inside a three-zone electric furnace. Catalyst bed temperatures were measured by six equally spaced thermocouple points located from the top to the bottom of the catalyst bed in an axial thermowell. The pilot plant was purged and pressure tested with nitrogen, depressured, then pressured to 100 psig with a blend of 1.0% oxygen in nitrogen and the recycle compressor started. The reactor effluent passed through a chilled liquid-gas separator, a moisture analyzer, a dryer containing 4 A molecular sieves, a compressor, a mass flowmeter, and back to the reactor. The gas circulation rate was adjusted to 0.7 standard liters per minute. A small amount of the recycle gas was allowed to bleed off the recycle loop and makeup oxygen/nitrogen blend was fed from a cylinder.

The catalyst was dried by circulating the oxygen/nitrogen blend and heating the to 500° F. The temperature was held at 500° F. until the reactor effluent contained less than 300 ppm water. The furnace temperature was then raised to 600° F. and held until water in the reactor effluent again was less than 300 ppm. Finally, the temperature was raised to 700° F. and held until the reactor effluent contained less than 100 ppm water. The reactor was cooled to 500° F. and the oxygen/nitrogen makeup gas replaced with dry nitrogen. The pilot plant was purged of oxygen and the pressure adjusted to 70 psig with the compressor continuing to operate at the same setting.

Catalyst reduction was initiated by switching the makeup gas from nitrogen to hydrogen and pressuring from 70 psig up to 100 psig. The compressor setting was then readjusted to again obtain a circulation rate of 0.7 standard liters per minute. After holding at 500° F. for an hour, the reactor furnace reactor temperature was raised to 700° F. at rate of 50° F./h. The temperature was held at 700° F. until water in the reactor effluent was less than 300 ppmv and then raised to 800° F. at 50° F./h. When moisture in the reactor effluent again fell below 300 ppmv, the temperature was raised to 900° F. and held until water in the reactor effluent was less than 100 ppmv. The furnace temperature was then lowered to 800° F. and preparations where made for naphtha feed introduction. This included putting a sulfur converter/sorber reactor on-line in the recycle loop between the naphtha feed introduction point and the reforming reactor. The purpose of the sulfur converter/sorber was to reduce sulfur compounds in the feed entering the reforming reactor to below 5 ppbv.

The naphtha feed from Example I was fed at a rate of 128 mL/h corresponding to a liquid hourly space velocity (LHSV) of 1.6 volumes of feed per volume of catalyst per hour. Pressure was controlled at 100 psig by allowing product hydrogen gas to exit the recycle loop through a back pressure regulator. The product hydrogen stream was analyzed and the hydrogen recycle rate was adjusted to obtain a hydrogen to naphtha feed molar ratio of 3.0. Liquid product was collected in the separator at 600° F. A level control and valve allowed the separator to drain into a debutanizer still which produced a $C_5+$ liquid product.

After feed introduction, the furnace temperature was rapidly raised until the catalyst aromatization activity was able to produce a liquid product comprising 42 wt. % aromatics. The yield of liquid product was about 85 LV % on feed. Thereafter as the catalyst deactivated temperatures were raised to maintain constant aromatics in the liquid product.

In order to determine aromatization activity in terms of a start-of-run temperature, the following procedure was used. After an initial lineout period, the average catalyst bed temperature was plotted against time to determine the catalyst deactivation rate. Such plots are generally linear and may be fitted by the least squares method. The slope of the line is the catalyst deactivation rate and the start-of-run-temperature is defined as the zero time intercept. An approximate eventual run length is estimated by making a linear extrapolation to the end of run temperature. At end of run, aromatics selectivity begins to decrease and catalyst deactivation accelerates markedly. The end of run temperature was expected to be 935° F. for the feed and run conditions above.

After startup, the pilot plant ran at constant LHSV, recycle ratio, pressure, and aromatics for 658 hours. A least squares fit of the reaction temperature data yielded a fouling rate of 0.026° F./h and a start-of-run temperature of 855° F. Assuming an end of run temperature of 935° F., the eventual run length would have been about 3100 hours if the reaction conditions had remained unchanged.

After 658 hours on-stream, reaction conditions were changed in order to study process variable effects. The run continued under various conditions for a total of 3810 hours. At the end of the run, the naphtha feed was stopped and hydrogen circulation was continued while the reactor furnace cooled to 500° F. The unit was then purged with nitrogen an allowed to cool to ambient temperature. Finally, the reactor was blocked off under nitrogen pressure and the catalyst saved for a future regeneration.

EXAMPLE III

First Regeneration of the Catalyst

The reactor containing the catalyst from Example II was reinstalled in the pilot plant, purged with nitrogen, and heated to reaction temperature in hydrogen. The reforming reaction was then resumed at the original space velocity, pressure, and recycle ratio to determine catalytic activity.

After 84 hours on stream it was determined that and an average catalyst temperature of 919° F. was required to make a $C_5^+$ liquid product containing 42 wt. % aromatics. The catalyst had therefore aged 74° F. since the start of run in Example II.

Hydrogen circulation continued while the naphtha feed was stopped and the reactor furnace was cooled to 500° F. At 500° F., the sulfur converter/sorber reactor was bypassed and blocked-in and the separator drained. Recycle gas circulation continued overnight while the recycle loop was purged with nitrogen and the reforming reactor cooled to 300° F.

The carbon burn was initiated at 300° F. and 95 psig by introducing air and about sixty standard cubic centimeters per minute of 1.0% oxygen/nitrogen blend to the recycle gas stream and adjusting the air flow to maintain about 1.0% oxygen in the gas entering the reforming reactor. The recycle gas rate was 1.3 standard liters per minute. The air was dried with molecular sieves and metered through a mass flowmeter. The oxygen/nitrogen blend was added to provide enough off-gas for oxygen analysis. The molecular sieve dryer remained in the recycle loop and moisture levels were measured before and after the dryer. Reactor inlet oxygen concentration was maintained at about 1.0% throughout the burn. Water in the reactor inlet stream was less than 5 ppmv.

Upon introducing air an exotherm equal to about 20° F. was obtained at the front end of the catalyst bed. This was attributed to the combustion of hydrocarbon vapors in the recycle gas. The exotherm subsided after several hours. The furnace temperature was held at 300° F. for 22 hours then raised to 500° F. at a rate of 50° F./h. As the furnace temperature was raised, the exotherm increased to about 25° F. and moved through the catalyst bed. The oxygen concentration in the reactor effluent dropped to zero. By the time the furnace temperature reached 500° F. the exotherm and oxygen consumption were decreasing again.

The furnace temperature was held at 500° F. for 20.0 hours then raised to 600° F. at a rate of 50° F. per hour. Again, the burning of catalyst coke accelerated as temperature was raised. The exotherm increased and oxygen in the reactor effluent decreased. The exotherm peaked at about 10° F. and oxygen conversion peaked at about 30%. A short time after the furnace temperature reached 600° F., the burning again subsided.

After holding at 600° F. for 22.0 hours, the furnace temperature was raised 50° F./h to 700° F. This time the peak exotherm was less than 5° F. After 22.0 hours at 700° F., the air and oxygen/nitrogen blend were shut-off. The recycle gas dryer which was now loaded with water and carbon dioxide was bypassed and a fresh dryer brought on-line. Gas circulation continued while the recycle loop was purged with nitrogen and the reforming reactor was cooled to 500° F.

Catalyst reduction was initiated at 500° F. by depressuring to 70 psig and then pressuring up to 100 psig with hydrogen while the compressor continued to operate. The makeup gas was switched from nitrogen to hydrogen. The temperature was held at 500° F. for one-hour and then raised 4° F./h to 900° F. The temperature was held at 900° F. for 16 hours before cooling to 800° F. for naphtha feed introduction.

EXAMPLE IV

Catalyst Performance After First Regeneration

After catalyst regeneration, the naphtha reforming reaction was resumed with the same conditions and feed used in Example II. Liquid product yields were the same as before regeneration and slightly better than with fresh catalyst. After 840 h on stream a least squares fit was made as before to determine the start-of-run temperature and deactivation rate. The start-of-run temperature was 859° F. and the catalyst deactivation rate was 0.017° F./h. Thus, the catalyst activity had been restored to within 4° F. of fresh catalyst. Surprisingly, the catalyst deactivation rate was significantly less than with fresh catalyst. The projected run length was 4300 hours compared to 3100 hours for the first cycle.

After determining start-of-run temperature and catalyst deactivation rate, the liquid hourly space was increased to 3.0 and the furnace temperature was increased to obtain a maximum catalyst bed temperature of 1025° F. in order to accelerate catalyst fouling. After 1464 hours at these conditions, the catalyst had reached approximately end of run activity and the liquid hourly space velocity was reduced to the original value of 1.6. The average catalyst bed temperature to produce a liquid product containing 42 wt. % aromatics was then determined to be 939° F. The catalyst had aged 80° F. from the start of the second run cycle.

EXAMPLE V

Second Regeneration of the Catalyst

At the conclusion of the run cycle described in Example IV, the naphtha feed was stopped and the reforming reactor was cooled to 500° F. while continuing to circulate hydrogen. At 500° F., the recycle loop was purged with nitrogen, the sulfur converter/sorber was taken off-line, and the separator was drained. Purging continued while the reactor cooled to 300° F.

The catalyst was then regenerated following substantially the same procedure used in Example III.

EXAMPLE VI

Catalyst Performance Following Second Catalyst Regeneration

After the second regeneration, the reforming reaction was restarted with same conditions and feed used at the start of the first and second run cycles. After 660 hours, a least squares fit was again made to determine the start-of-run temperature and catalyst deactivation rate. The start-of-run temperature was determined to be 874° F. and the catalyst deactivation rate was 0.012° F./h. The projected run length at these conditions was therefore about 5000 hours. The start-of-run temperature had declined 13° F. from the start of previous run cycle, but the catalyst deactivation rate was again reduced so that projected run length had increased. The liquid $C_5^+$ yield was the same as after the first regeneration.

EXAMPLE VII

Regeneration without Dryer

A coked catalyst from a 4700 hour pilot plant run was saved and later returned to service at the same conditions used in the previous examples. Prior to its use, the catalyst had the same composition as the catalyst used in Example II. After 330 hours on-stream, the average catalyst bed temperature was 930° F. and liquid product contained 42 wt. % aromatics. The yield of liquid product on feed was beginning to decline and was 85.5 LV %.

At this point the naphtha feed was stopped and the reactor cooled to 500° F. in circulating hydrogen. At 500° F., the recycle loop was purged with nitrogen and the sulfur converter/sorber reactor and recycle gas dryer were bypassed and the separator was drained. The pressure was adjusted to 85 psig. This time the carbon burn was started at 500° F. Air and oxygen/nitrogen blend were added to the recycle gas stream as in Examples III and V, but the oxygen content at the reactor inlet was adjusted to 0.5% instead of 1.0%. The dryer remained bypassed throughout the burn. There was compete oxygen conversion and the exotherm was about 12° F. After holding at 500° F. for 1.5 hours, the furnace temperature was raised 25° F./h to 700° F. Oxygen breakthrough occurred when the furnace temperature reached about 640° F. There was only a small amount of burning by the time the furnace temperature reached 700° F. and the exotherm was negligible. Reactor inlet oxygen level was raised to 1.0% and the temperature held at 700° F. for 20 hours to complete the burn. The exotherm during the final burn was less than 2° F.

Since the recycle gas dryer was bypassed, water built up in the recycle gas during the burn until it reached saturation levels in the separator. Moisture levels in the recycle gas exceeded 2000 ppm well into the 700° F. hold period.

After completing the carbon burn, the recycle loop was purged with nitrogen and the reactor was cooled to 500° F. while recycle gas circulation continued. At 500° F. the dryer and the sulfur converter/sorber were put back on line. When water in the recycle gas fell below 100 ppmv, the plant was pressured up 100 psig with hydrogen to initiate catalyst reduction. After an hour at 500° F., the reactor was heated to 900° F. at rate of 10° F./h. The reactor was held at 900° F. until the moisture content of the reactor effluent was less a than 100 ppm then cooled to 800° F. for feed introduction.

EXAMPLE VIII

Catalyst Performance after Regenerating without a Dryer

After the catalyst regeneration in Example VII, the naphtha feed was restarted and the reforming reaction resumed for 590 hours. The feed and the run conditions were the same as in Example II. Catalyst performance was not as good as obtained in Examples II, IV, or VI. The start-of-run temperature was 868° F. and the fouling rate was 0.031° F./h. The projected run length was therefore only about 2100 hours.

EXAMPLE IX

Regeneration with Dryer

The regeneration procedure of Example VIII was repeated with another coked catalyst sample except that the recycle gas dryer was employed during the carbon burn and consequently the reactor inlet moisture levels were always less than 5 ppm. The catalyst composition prior to its use as a reforming catalyst was the same as that used in Examples II and VII.

EXAMPLE X

Catalyst Performance After Regeneration with Dryer

The catalyst regenerated in Example IX was tested with the same run conditions and feed as in Example VIII. After 576 hours on-stream, the start-of-run temperature was 862° F. and catalyst deactivation rate was 0.019° F./hr. The projected run length was 3800 hours compared to 2100 in Example VIII.

The results of from Examples I to X are summarized in Table 1 below.

TABLE 1

| Description | Examples | Start of Run Temp. °F. | Deactivation Rate °F./h | Projected Run(hours) |
| --- | --- | --- | --- | --- |
| Fresh Catalyst | II | 855 | 0.026 | 3100 |
| First Regeneration | II–IV | 859 | 0.017 | 4100 |
| Second Regeneration | V–VI | 874 | 0.012 | 5000 |
| Regeneration without Dryer | VII–VIII | 868 | 0.031 | 2100 |
| Regeneration with Dryer | IX–X | 862 | 0.019 | 3800 |

The Table clearly shows that a controlled low temperature carbon-burn regeneration procedure restores most of the activity present at the start of the previous run cycle and that catalyst deactivation rates are significantly reduced, such that several cycles are possible before there is a need for platinum redispersion. The results further show the advantage in using a dryer to reduce the water content of the recycle gas during the carbon burn. These results are surprising in view of the prior art and afford the opportunity to increase cycle length and avoid the use of corrosive and sometimes highly toxic halogen compounds during regeneration.

EXAMPLE XI

Regeneration Procedure for a Large-Scale Plant

Allowing for differences in the exotherm as compared to a pilot plant, a commercial unit with four reactors in series is regenerated as follows. Naphtha feed is withdrawn and hydrogen is circulated at high temperature to strip hydrocarbon from the catalyst. The separator and knockout drums are periodically drained of hydrocarbon. Hydrogen circulation is continued while the reactors are cooled to about 420° F. At 420° F., the recycle loop is purged with nitrogen and low points are checked for liquid hydrocarbons. After periodic draining shows that little or no hydrocarbon liquids are being collected, it is advantageous to switch to a fresh recycle gas dryer which is substantially free of hydrocarbons and water. If there is a recycle gas sulfur converter/sorber, it will be bypassed at this point.

When the reactor inlets are at 420° F. and the level of combustibles in the recycle gas is less than 2.0%, air is introduced to the recycle gas stream. The oxygen level at the first reactor inlet is adjusted to 0.5%. The burning of residual combustibles in the recycle gas consumes all the oxygen and results in an 80° to 125° F. exotherm across the first reactor. Eventually, the vapor-phase combustibles are consumed and the burn-wave moves through the reactor chain. After oxygen breakthrough occurs and the exotherm subsides, furnace temperatures are raised at rate of about 25° F./h until peak catalyst bed temperature reaches 700° F. The total exotherm at this point is less than about 20° F. When oxygen conversion across the reactor train drops to less than 10%, the oxygen concentration at the reactor inlet is raised to 1.0 to 4.0% and the furnace temperatures are adjusted to maintain the peak catalyst bed temperatures as close to 700° F. as possible.

Temperatures are maintained at 700° F. for 12 to 24 hours before the air makeup is stopped. The recycle loop is then purged with nitrogen and cooled to 500° F. At 500° F. the recycle gas dryers are switched again and the sulfur converter/sorber is brought back on-line. About twice the stoichiometric amount of hydrogen needed for reduction of the catalyst is fed into the unit over a period of about an hour. The unit is then partially depressured and pressured up with hydrogen to adjust the hydrogen to nitrogen ratio to about one-to-four. Higher hydrogen to nitrogen ratios can result in excessive ammonia formation, which is catalyzed by the iron particles present in the reactor tubes. The temperature is held at 500° F. for about an hour then raised 10° F./h to 900° F. The hydrogen/nitrogen ratio is maintained by adjusting hydrogen and nitrogen makeup rates. The temperature is held at 900° F. for at least 12 hours. When water in the fourth reactor effluent is less than 100 ppm, the temperature is dropped to 700° F. or lower to await feed introduction.

EXAMPLE XII

Reforming With A Silicalite Catalyst/Catalyst Coking

A silicalite catalyst was produced by impregnating a dried synthesized Silicalite powder to give 1% Pt on the Silicalite powder, then mixing this with SAPO-11 powder to produce a finished catalyst consisting of 25% wt SAPO-11 and 75% wt Pt Silicalite.

the catalyst with low concentrations (0.5 to 2.0 wt. %) of oxygen at 30 to 100 psig at a GHSV of 923. During regeneration, the regeneration gases contained less than 100 ppm water.

The regeneration temperature was varied over the range of 450° to 680° F. Regenerations below about 500° F. for 16 to 24 hours were not successful in producing a catalyst having an activity (as measured by hexane conversion) or a selectivity (as measured by the wt. % benzene in the product) similar to fresh catalyst. At regeneration temperatures between 550° and 680° F., aromatization activity was restored to about that of the start of the run cycle.

Table 2, below, shows the regeneration temperatures and times for several of these regenerations, along with the activity and selectivity results. The regenerated catalyst was able to maintain product benzene levels of about 40 wt. %, for greater than 1000 hours between regenerations.

TABLE 2

| | REGENERATION CONDITIONS | | | | SELECTIVITY AND ACTIVITY RESULTS* | | | | |
|---|---|---|---|---|---|---|---|---|---|
| | | | | | Before Regen. | | After Regen. | | |
| Regen. No. | Temp. °F. | Hours | $O_2$ Level % | Pressure psig # | Hexane Conv. | Product wt. % BZ | Hexane Conv. | Product wt. % BZ | Hours on Stream[1,2,4] Producing BZ |
| 10 | 600 | 72.0 | 0.5 | 30 | 55 | 14 | 74 | 41 | 1200 |
| | 630 | 46.7 | 1.0 | 100 | | | | | |
| 11 | 600 | 46.8 | 1.0 | 100 | 82 | 27 | 68 | 39 | 1200 |
| | 630 | 3.6 | 1.0 | 100 | | | | | |
| 12 | 600 | 26.3 | 1.0 | 100 | 86 | 8 | 72 | 41 | 1700 |
| | 630 | 65.3 | 1.0 | 100 | | | | | |
| | 660 | 119.2 | 1.0 | 100 | | | | | |
| 13 | 600 | 66.6 | 1.0 | 100 | 59 | 24 | 98 | 39 | 1000+[5] |
| | 630 | 24.9 | 1.0 | 100 | | | | | |
| | 660 | 30.9 | 1.0 | 100 | | | | | |
| | 680 | 43.9 | 1.0 | 100 | | | | | |
| 0 | Fresh Catalyst at 21 Hrs. on Stream | | | | 98[3] | 42[3] | | | |

*Conversion Conditions: 30 psig, WHSV = 0.72, Catalyst Temp. 880° F. to 1000° F.
[1]Utilizing Feed B (Table 3)
[2]At constant (40%) aromatization activity.
[3]Utilizing Feed A (Table 3)
[4]BZ = Benzene
[5]Run was voluntarily terminated; catalyst remained active.

This catalyst was used to convert hexane containing feeds to aromatics. The feed compositions are listed in Table 3. The conversion conditions used were a pressure of 30 psig, a WHSV of 0.72, a hydrogen to hydrocarbon ratio of seven to one, with the catalyst temperatures ranging from 880° to 1000° F. to maintain a high product benzene level and adjust for fouling.

EXAMPLE XIII

Regeneration Of Silicalite Catalyst

The catalyst of Example XII was repeatedly coked and regenerated. The regeneration conditions included treating

TABLE 3

| | FEED COMPOSITION | |
|---|---|---|
| COMPOUND | FEED A LIGHT NAPHTHA wt. % | FEED B MODEL FEED wt. % |
| Total $C_5$ | 16.1 | 0.0 |
| Total $C_6$ | 49.7 | 70.0 |
| Total $C_7$ | 34.2 | 24.0 |
| N—$C_6$ | 12.5 | 70.0 |
| Methyl Cyclohexane | 5.9 | 6.0 |

Feed A used for start of run.
Feed B used for regeneration studies.

EXAMPLE XIV

Effect of Raising Temperature After Substantially Completing Carbon Burn at Low Temperatures This example shows that temperature may be raised beyond the 780° F. limit after substantially completing a halogen-free carbon burn regeneration at lower temperatures. A platinum on barium exchanged L-zeolite catalyst was used to reform,a light naphtha feedstock very similar to the one shown in Table 1 of the specification. At the end of the run, the catalyst was regenerated as follows.

The naphtha feed was stopped. The reactor was cooled to 500° F. while adding makeup hydrogen. After reaching 500° F., the unit was purged with nitrogen gas to remove substantially all of the hydrogen. Any remaining liquid hydrocarbons were drained from the gas liquid separator and other low points in the system. The nitrogen makeup rate was then reduced to a low level, the sulfur converter/sorber was by-passed, and the pressure and recycle gas rate were adjusted to about 85 psig and 1000 GHSV, respectively.

After purging the recycle loop with nitrogen, air was added. through a mass flowmeter to bring the reactor inlet oxygen concentration to 0.5%. After holding for two hours at 500° F., the temperature was raised 25° F./h to 760° F. while the inlet oxygen level was maintained between 0.4 and 0.6%. The temperature was then held overnight at 760° F. with the inlet oxygen level between 1.0 and 1.3%.

After 16 hours at 760° F., the carbon burn was substantially complete as indicated by the difference between inlet and oxygen concentrations which was less than 0.05%. The temperature was then raised to 850° F. and maintained at 850° F. for 14 hours. A small amount of additional burning occurred at the high temperature but at a very low rate.

The reactor was then purged with nitrogen and a fresh recycle gas dryer brought on-line while the reactor cooled to 500° F. When the water level in the reactor effluent was less than 100 ppm, catalyst reduction was initiated by pressuring from 85 to 100 psig with hydrogen. The nitrogen makeup gas was stopped and pressure was maintained at 100 psig by adding hydrogen makeup gas. The temperature was held at 500° F. for two hours and then raised 10° F./h to 900° F.

Feed was reintroduced and the reforming reaction was resumed at the same conditions used in our previous examples and temperature was adjusted to maintain 42 wt. % aromatics in the liquid product. After 1070 hours on-stream, a least-squares plot was made of the data from 186 to 1070 hours. From this plot, it was determined that the start-of-run temperature was 868° F./h and the fouling rate was 0.020° F./h, which compares to 850° F. and 0.026° F./h, respectively, for fresh catalyst. The projected run length was 3350 hours compared to 3300 for fresh catalyst. The regeneration was not as good as those of the previous examples where temperature was kept below 780° F. but was considered acceptable.

As can be seen by this Example, there was no improvement in catalyst performance obtained by raising temperature of the oxygen after substantially completing the carbon burn at a temperature below 780° F.

EXAMPLE XV

Regeneration with up to 520 ppm Water in the Recycle Gas

This experiment shows that up to 520 ppm water can be present in the recycle gas and still achieve an acceptable regeneration. It is, therefore, possible although not preferred to use wet air for the regeneration. Also, one may consider using a less expensive dessicant than molecular sieves in the recycle gas dryer, such as silica-gel or activated alumina.

The catalyst from Example II was regenerated a second time as follows. Preparations for the carbon burn were the same as above. Before adding air, water was added to the recycle gas stream by bubbling makeup nitrogen through water contained in a small bomb. The makeup nitrogen feed rate was adjusted to obtain about 500 ppmv water in the gas stream entering the reactor and air was added to bring the oxygen level to 0.5%. During the carbon burn, the reactor inlet oxygen level was maintained between 0.4 and 0.6 and the inlet water level between 420 and 520 ppmv by adjusting the air and nitrogen feed rates.

After holding for two hours at 500° F., the temperature was raised 25° F./h to 700° F. while maintaining inlet oxygen levels between 0.4% and 0.7%. The temperature was then held 20 hours at 700° F. with the inlet oxygen level rising from 0.6 and 1.2%. The air was then shut off and dry makeup nitrogen was substituted for water-saturated nitrogen. A fresh dryer was put on-line and the reactor was cooled to is 500° F.

When the water level in the reactor effluent was less than 100 ppm, the catalyst was reduced and the reforming reaction resumed as in the previous example. After 600 hours on-stream, the start-of-run temperature and fouling rate were calculated to be 875° F. and 0.0186° F., respectively. This corresponds to a projected run length of 3225 hours, which is close to that of fresh catalyst.

What is claimed is:

1. A process for regenerating a coke-contaminated reforming catalyst comprising platinum on a L-zeolite molecular sieve or platinum on a silicalite molecular sieve, said process comprising of:

(a) contacting said catalyst in a catalyst zone with a halogen-free oxygen-containing gas at a temperature of less than 780° F., said gas having a water content of less than about 1000 ppmv; and (b) oxidizing at least a portion of said coke to produce a combustion gas for a sufficient period of time such that the catalyst aromatization activity is restored to within 20° F. of the activity said catalyst possessed at the start of the previous ran cycle.

2. A process for regenerating a coke-contaminated reforming catalyst comprising platinum on a L-zeolite molecular sieve or platinum on a silicalite molecular sieve, said process comprising of:

(a) contacting said catalyst in a catalyst zone with a halogen-free oxygen-containing gas at a temperature of less than 780° F., said gas having a water content of less than about 1000 ppmv;

(b) oxidizing at least a portion of said coke to produce a combustion gas for a sufficient period of time such that the catalyst aromatization activity is restored to within 20° F. of the activity said catalyst possessed at the start of the previous ran cycle;

(c) passing at least a portion of said combustion gas through a dryer to produce a dried gas having a water content less than said portion of combustion gas; and (d) recycling at least a portion of said dried gas to said catalyst zone.

3. A process for regenerating a coke-contaminated reforming catalyst comprising platinum on a L-zeolite molecular sieve or platinum on a silicalite molecular sieve, said process comprising of:

(a) contacting said catalyst in a catalyst zone with a halogen-free oxygen-containing gas at a temperature of less than 780° F., said gas having a water content of less than about 1000 ppmv;

(b) oxidizing at least a portion of said coke to produce a combustion gas for a sufficient period of time such that the catalyst aromatization activity is restored to within 20° F. of the activity said catalyst possessed at the start of the previous run cycle;

(c) passing at least a portion of said combustion gas through a dryer to produce a dried gas having a water content less than said portion of combustion gas;

(d) recycling at least a portion of said dried gas to said catalyst zone; and (e) reducing the catalyst by contracting the catalyst with a gaseous stream containing hydrogen at an initial temperature from 300° F. to 700° F.

4. The process as recited in claim 1, 2 or 3 wherein the oxygen content of the halogen-free oxygen containing gas is from between about 0.1 to about 21.0 mole % oxygen.

5. The process as recited in claim 1, 2 or 3 wherein the oxygen content of the halogen-free oxygen containing gas is from between about 0.2 to about 4.0 mole %.

6. The process as recited in claim 1, 2 or 3 wherein the catalyst is the platinum on a L-zeolite molecular sieve.

7. The process as recited in claim 1, 2 or 3 wherein the catalyst is the platinum on a silicalite molecular sieve.

8. The process as recited in claim 1, 2 or 3 wherein the L-zeolite further comprising an alkaline earth metal.

9. The process as recited in claim 1, 2 or 3 wherein the L-zeolite further comprises boron.

10. The process as recited in claim 1, 2 or 3 wherein said catalyst is bound with a support matrix comprising alumina, silica or mixtures thereof.

11. The process as recited in claim 3 further comprising raising the temperature of the gaseous stream containing hydrogen to between 800° F. and 1000° F. to complete the dryout and reduction.

12. The process as recited in claim 3 wherein the catalyst is contacted with the halogen-free oxygen-containing gas at a temperature of less than 500° F.

13. The process as recited in claim 12 wherein the temperature is escalated in a slow ramping fashion.

14. The process as recited in claim 12 wherein the temperature is escalated in a stepwise fashion.

15. The process as recited in claim 1, 2 or 3 wherein the peak catalyst temperature during the carbon burn step is between 600° F. and 750° F.

16. The process as recited in claim 3 wherein prior to reducing the catalyst, the catalyst is purged with an inert gaseous stream.

17. The process as recited in claim 3 further comprising:

passing at least a portion of said gaseous stream containing hydrogen through a dryer; and recycling a portion of said gaseous stream containing hydrogen to said catalyst zone.

18. The process as recited in claim 3 comprising further reducing the regenerated catalyst by contacting the catalyst with a gaseous stream containing a mixture of inert gas and hydrogen at a temperature between 900° F. and 1000° F.

19. The process as recited in claim 3 comprising further reducing the regenerated catalyst by contacting the catalyst with a gaseous stream containing a mixture of nitrogen and hydrogen at a temperature between 900° F. and 1000° F.

20. The process as recited in claim 19 wherein the mole ratio of nitrogen gas to hydrogen gas is a least 4:1.

21. A process for regenerating a coke deactivated reforming catalyst, comprising:

(a) contacting a coke-contaminated L-zeolite catalyst with a halogen-free oxygen-containing gas at a temperature of less than 780° F., said gas having a water content between 100 and 1000 ppmv;

(b) oxidizing at least a portion of said coke to produce a combustion gas for a sufficient period of time such that the aromatization activity of the L-zeolite catalyst is restored within 20° F. of the activity said catalyst possessed at the start of the previous run cycle;

(c) passing at least a portion of said combustion gas through a dryer to produce a dried gas having a water content less than said portion of combustion gas;

(d) recycling at least a portion of said dried gas to said catalyst; and (e) reducing the regenerated catalyst by contacting the catalyst with a gaseous stream containing hydrogen at an initial temperature from 300° F. to 700° F.

22. The process as recited in claim 21 further comprising the step of purging the catalyst resulting from step (b) with a gaseous stream comprising nitrogen prior to the reduction step (e).

23. The process as recited in claim 21 further comprising the step of purging the catalyst resulting from step (b) with a gaseous stream comprising nitrogen prior to the reduction step (e) and changing to a fresh recycling gas dryer so as to reduce carbon dioxide in the recycle gas to less than 100 ppm.

24. The process as recited in claim 21 wherein the L-zeolite catalyst contains barium.

25. A reforming process wherein a reforming catalyst is regenerated for at least two cycles by the process as recited in claim 1, 2, 3 or 21.

26. The process as recited in claim 1, 2, 3 or 21 wherein the catalyst is continuously withdrawn from reactors for regeneration in a separate vessel, and returned to the reactors.

27. A reforming process comprising contacting a hydrocarbon feed with a platinum containing L-zeolite molecular sieve or platinum containing silicalite molecular sieve catalyst under reforming conditions and regenerating said catalyst in accordance with the process of claim 1, 2 or 3.

28. The process as recited in claim 1, 2 or 3 wherein said halogen-free oxygen-containing gas has a water content of 520 ppmv or less.

29. The process as recited in claim 21 wherein said halogen-free oxygen-containing gas has a water content between 100 and 520 ppmv.

* * * * *